United States Patent
Kowalski et al.

[11] 3,714,868
[45] Feb. 6, 1973

[54] VALVE SYSTEM FOR PROPORTIONAL FLOW CONTROL FOR FLUID-OPERATED MOTOR

[75] Inventors: Slawomir Kowalski, Rockaway; Donald A. Worden, Pompton Plains, both of N.J.

[73] Assignee: Marotta Scientific Controls Inc., Boonton, N.J.

[22] Filed: Sept. 23, 1970

[21] Appl. No.: 74,612

[52] U.S. Cl. .........................91/420, 91/454, 91/459
[51] Int. Cl. .........................F15b 11/08, F15b 13/04
[58] Field of Search........91/420, 454, 459, 275, 361; 137/495

[56] References Cited

UNITED STATES PATENTS

| | | | |
|---|---|---|---|
| 3,534,770 | 10/1970 | Kowalski | 137/509 |
| 3,608,431 | 9/1971 | Pease | 91/454 |
| 2,328,980 | 9/1943 | Herman et al. | 91/420 |
| 2,389,654 | 11/1945 | Van der Werff | 91/420 |
| 2,401,258 | 5/1946 | Livers | 91/420 X |
| 3,036,598 | 5/1962 | Smith et al. | 91/459 X |
| 3,250,185 | 5/1966 | Tennis et al. | 91/420 |
| 3,433,131 | 3/1969 | Soyland et al. | 91/454 X |
| 3,524,386 | 8/1970 | Cudnohufsky | 137/495 X |

*Primary Examiner*—Martin P. Schwadron
*Assistant Examiner*—Irwin C. Cohen
*Attorney*—Sandoe, Hopgood & Calimafde

[57] ABSTRACT

This system for controlling the flow of working fluid to and from a motor includes valves that regulate the working fluid flow so that it is proportional to the force applied to move the valves into open position regardless of changes in pressure in the system. The motor is double-acting and its movement is sometimes against the load and sometimes in a direction in which the load assists the movement of the motor. In the latter case it is important that the exhaust from the motor be regulated to control the speed since the supply of working fluid to the other end of the motor may produce excessive speed. Both the rate of inlet and exhaust of the working fluid, therefore, are determined by proportional flow control valves having their flow dependent upon the force applied to solenoids or other actuators for the valves.

8 Claims, 6 Drawing Figures

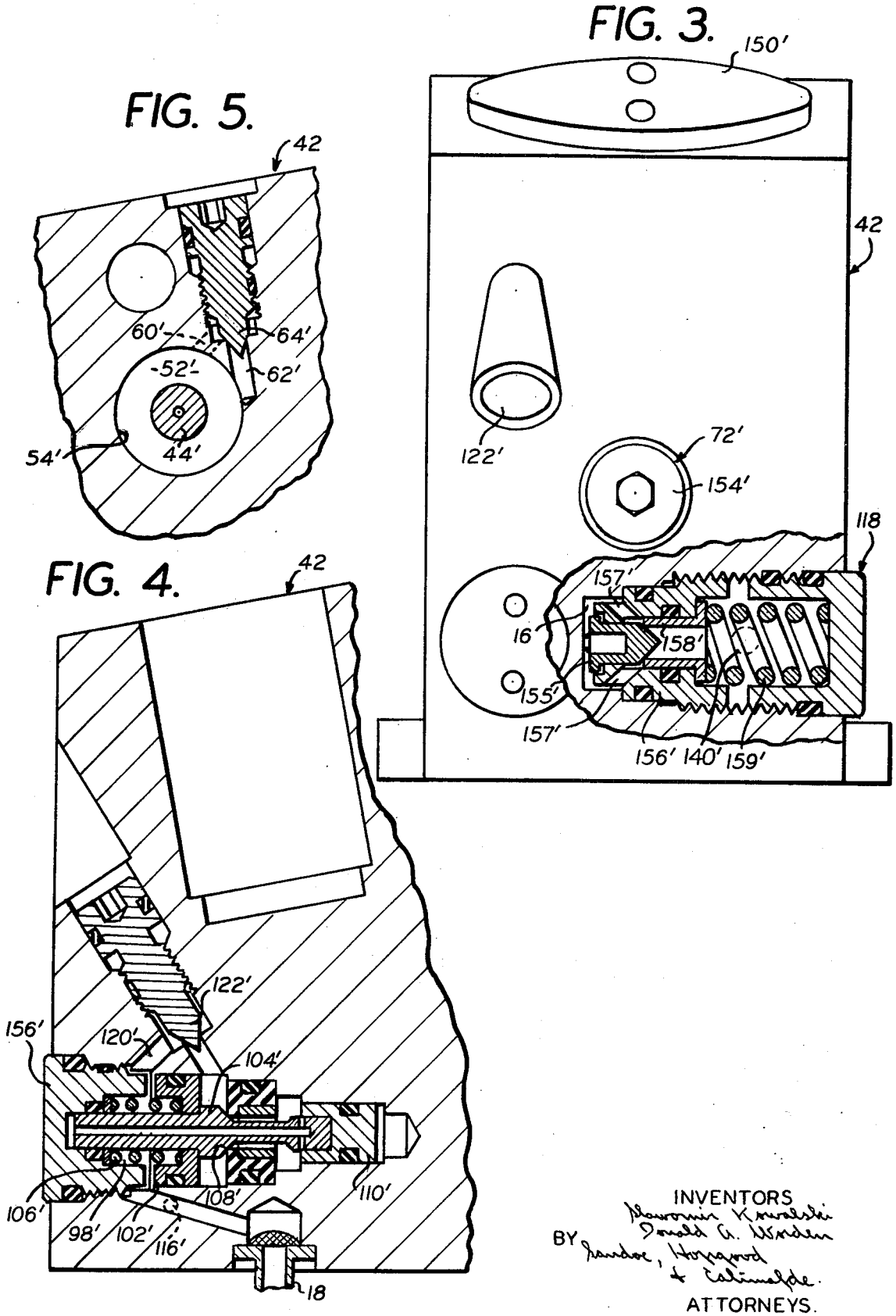

VALVE SYSTEM FOR PROPORTIONAL FLOW CONTROL FOR FLUID-OPERATED MOTOR

BACKGROUND AND SUMMARY OF THE INVENTION

The control system of this invention supplies working fluid to a motor; and it will be described in connection with a cylinder-and-piston motor in which the piston moves a load through a rack and pinion connected with an arm to which the load is connected. The motor can be used for other apparatus and the rack and pinion connected with the angularly movable arm is illustrative of a load, and is a particular type of load with which the present invention is especially useful.

The motor illustrated herein is a cylinder-and-piston motor with a fixed cylinder and movable piston. It will be understood, however, that this relationship can be reversed and the cylinder made the movable element, and it will be understood also that any linear, oscillatory or rotary motor are to be considered equivalent to the motor illustrated insofar as the broader aspects of the invention are concerned.

Sometimes the load is moved against resistance, as when lifted against the force of gravity. Sometimes the load is being moved downward or in a direction where gravity or another force acting on the load assists the motor. In such a case the motor does no work but must restrain the movement of the load to the desired rate of displacement and in doing so, exert a braking action.

In order to control the movement of a part under such varying circumstances, proportional flow control valves are used in this invention to control the rate of displacement of the movable element of the motor and of the arm or other apparatus that the motor operates. The expression "proportional flow control valve" as used herein, designates a valve in which the rate of flow of working fluid through the valve, to or from the motor, is dependent upon the force applied by an actuator that operates the valve. With such valves, the rate of flow is independent of variations in the load and fluid supply pressure within the operating limits at which the control is intended to be used.

With a double-acting motor, such as a cylinder-and-piston motor having a movable piston, control of working fluid flow requires that the valves not only regulate the supply of working fluid that operates the piston, but also the exhaust of working fluid from the other side of the piston when the motor must retard the speed of displacement of the load.

Valves that provide proportional flow control use a reference orifice across which the pressure drop is proportional to the rate of fluid flow. A piston, or other movable wall, subject on different sides to the pressure drop across the reference orifice, moves the valve element closer to or further from its seat in response to changes in this pressure drop to maintain a constant rate of flow.

In order to adjust the rate of flow with respect to the force applied to actuate the valve element, the reference orifice is preferably made adjustable. By having means that are adjustable from outside of the valve housing, and while the apparatus is operating, the apparatus can be regulated while the motor is operating to obtain the desired displacement speed.

Other objects, features and advantages of the invention will appear or be pointed out as the description proceeds.

BRIEF DESCRIPTION OF DRAWING

In the drawing, forming a part hereof, in which like reference characters indicate corresponding parts in all the views:

FIG. 3 is an end view, partly broken away and in section, of the construction shown in FIG. 2 when viewed from the left side of FIG. 2: the sectional portion of FIG. 3 being taken on the line 3—3 of FIG. 2;

FIG. 4 is a sectional view taken along the line 4—4 of FIG. 3;

FIG. 5 is a sectional view taken along the line 5—5 of FIG. 2; and

DESCRIPTION OF PREFERRED EMBODIMENT

Figure 1:
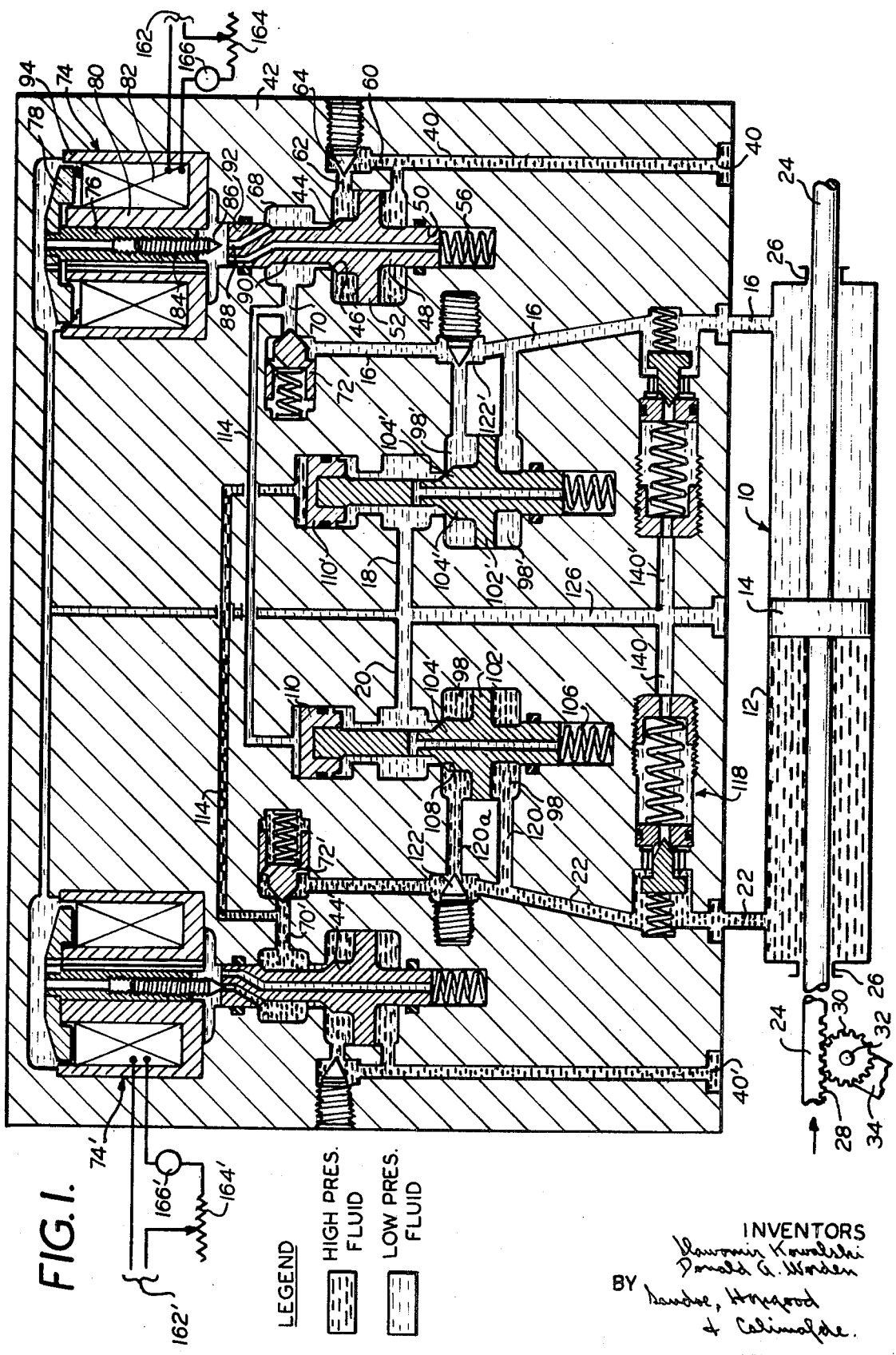
FIG. 1 is a schematic illustration showing the invention applied to a cylinder-and-piston motor that operates an angularly movable arm through a rack and pinion connection.

FIG. 1 shows a stationary cylinder-and-piston motor 10 having a stationary cylinder 12 and a piston 14 that moves back and forth in the cylinder in response to the supply and exhaust of working fluid through a passage 16 in the right-hand end of the cylinder and another passage 22 at the left-hand end of the cylinder. Exhaust passages 18 and 20 in the valve housing communicate through the exhaust valves with the passages 16 and 22 leading to the motor 10.

A piston rod 24 extends through bearings 26 in the end walls of the cylinder 12; and this piston rod 24 carries a rack 28 located along a portion of the rod 24 that never enters the bearing 26. The rack 28 meshes with a pinion 30 on a shaft 32 that rotates in suitable bearings (not shown). There is an arm 34 operably connected to the pinion 30 and shaft 32 for operating a load. This load is displaced by the arm 34 and is sometimes moved in a direction against the force of gravity while at other times it is moved in such a direction that the motor has to resist the force of gravity. It will be understood that other load conditions may require the motor to exert a force on the load displacement sometimes and exert a braking action on the load displacement at other times.

Working fluid for the right-hand end of the cylinder 12 is supplied from a fluid supply line 40 to a valve housing 42 which encloses a chamber in which there is a valve element 44 that closes against a valve seat 46.

The valve element 44 has a stem 48 which slides in a guide 50. The valve element 44 also has a flange 52 which slides along a cylindrical wall 54 of the valve chamber. The flange 52 comprises a piston moving in a cylinder consisting of the wall 54.

A spring 56 urges the valve element 44 into contact with the seat 46 to give the valve element 44 a bias toward closed position. The fluid supply line 40 communicates with the valve chamber of the housing 42 on the opposite side of the piston 52 from the valve element 44. Working fluid passes around the flange or piston 52 through a by-pass 60 which includes an adjustable reference orifice 62 consisting of a needle valve 64 that moves toward and from a portion of the by-pass to regulate the cross section of the by-pass 60.

The orifice is the annular clearance between the conical face of the needle valve and the adjacent face of the by-pass toward and from which the needle valve moves as it is adjusted one way or the other along screw threads 66.

When the valve element 44 is in open position, working fluid from the supply line 40 passes into the valve housing 42 into the part of the valve chamber below the piston 52. The working fluid then flows through the by-pass 60, past the open valve 44 and through an outlet clearance 68 to a fluid line 70 which communicates with the passage 16 leading to the right-hand end of the cylinder 12. There is a check valve 72 between the fluid line 70 and the passage 16; and this check valve permits flow of working fluid toward the cylinder 12 but prevents any back flow from the cylinder 12 toward the fluid line 70.

The valve element 44 is moved into open position by a solenoid 74 which has a plunger 76 with an armature 78 at one end extending across the core 80 and the windings 82 of the solenoid.

The end of the plunger 76 which is remote from the armature 78 has a reduced-diameter portion 84 which is pointed at its end to form a needle valve 86 which closes a passage 88 in a stem 90 of the valve element 44. This stem 90 slides in a guideway 92 in the valve chamber. A spring 94 between the core 80 and the armature 78 urges the armature 78 and plunger 76 upward in FIG. 1 so that the needle valve 86 moves away from the passage 88 whenever the windings 82 are not energized. Thus the valve chamber downstream from the valve element 44, the fluid line 70 and all spaces in the solenoid 74 are under return line (exhaust) fluid pressure when the windings 82 are not energized, since the spaces around the solenoid 74 are vented to a return line 126.

The solenoid 74 is energized with a controlled amount of current which determines the pull of the armature 78. Fluid flow and therefore piston speed depends only on the pull of the armature 78. The valve element 44 is controlled so that it will always deliver working fluid at substantially the same rate of flow for a given pull of the armature 78 regardless of variations of pressure in the fluid supply line 40 and regardless of changes in the load on the hydraulic motor 10. This is, of course, subject to the qualification that the working fluid from the fluid supply line 40 is at high enough pressure to move the piston 14 against its load.

This constant flow rate, proportional to the pull of the armature 78, is obtained by having the flange or piston 52 subject to the pressure from the fluid supply line 40 on one side and subject to the lower downstream pressure beyond the needle valve 64 on the other side. The pressure drop through the by-pass 60 is proportional to the flow of fluid through the by-pass for any given setting of the needle valve. This pressure drop determines the pressure differential on opposite sides of the flange or piston 52 and the pressure on the high-pressure side of the piston 52 acts against the pull of the armature 78. As the flow through the by-pass 60 increases, therefore, the pressure differential across the piston 52 increases and the piston 52 exerts a stronger force against the pull of the armature 78 and thus moves the valve element 44 toward closed position. This reduces the flow through the by-pass 60 and reduces the pressure differential across the piston 52. A balance is reached where the flow through the by-pass 60 is stabilized at a value which depends upon the pull of the armature 78 and this, in turn, depends upon the amount of current supplied to the windings 82 of the solenoid. The speed of the motor 10 is controlled, therefore, by changing the excitation of the solenoid 74 and is independent of variations in the pressure in the fluid supply line 40.

Working fluid is supplied to the left-hand end of the cylinder 12 to move the piston 14 in the opposite direction when the motor 10 is required to be a double-acting motor. The apparatus for supplying working fluid to the left-hand end of the cylinder 12 is the same as that described for supplying working fluid to the right-hand end of the cylinder 12 and corresponding parts are indicated by the same reference characters with a prime appended. There is a check valve 72' for preventing working fluid from flowing back from the left-hand end of the cylinder 12 toward the fluid supply line 40'.

The check valves 72 and 72' prevent reverse flow when the motor is locked in a stationary position. To lock the motor in a stationary position and to control the speed when the motor is subjected to aiding load, exhaust valves 104 and 104' are supplied. They control the flow rate of fluid from passages 16 and 22 to return 126.

The exhaust valve is located in a valve chamber 98. The chamber 98 is cylindrical and contains a piston 102 which is connected to a valve element 104 on the side of the piston 102 which is opposite a passage 120 leading from passage 22 into the chamber 98 below the piston 102. A spring 106 urges the piston 102 upward to give the valve element 104 a bias toward closed position in which the valve element 104 contacts with a seat 108.

The portion of the chamber 98 beyond the seat 108 contains an actuator piston 110 which moves downward in FIG. 1 to shift the valve element 104 into open position when pressure is applied above the actuator piston 110 from a connecting line 114 which communicates with the working fluid line 70.

The passage 22 communicates with a relief valve 118. When the relief valve 118 is closed, working fluid from the passage 22 flows through a passage 120a which communicates with the part of the chamber 98 above the piston 102; and there is a needle valve 122 for regulating the cross section of the passage 120a to control the pressure drop through this passage 120a for any given rate of flow.

When the valve element 104 is in open position, working fluid passing through the passage 120a flows past the valve element 104 into the downstream portion of the chamber 98 and out through an exhaust line 126. The relief valve 118 is shown connected with the exhaust outlet pipe 136 by an exhaust vent line 140.

Whenever the solenoid 74 is energized to open the valve element 44, and working fluid is supplied through the fluid supply line 70 and passage 16 to the cylinder 12, working fluid also flows through the connecting line 114 to the piston 110 which actuates the valve element 104. The pressure in the connecting line 114 moves the actuator piston 110 against the force of the spring 106 so that the valve element 104 is in open position and permits the exhaust of working fluid from the left-hand end of the cylinder 12 as working fluid is supplied to the right-hand end through the passage 16.

In the conditions shown in FIG. 1, high pressure liquid is shown flowing to the left-hand end of the cylinder and liquid at return line (exhaust) pressure is shown flowing from the right-hand end of the cylinder 12. This requires that the solenoid 74' be energized to hold the valve element 44' open, and the pressure of the fluid supply is communicated through the passage 114' to the actuator piston 110' to move the exhaust valve in open position; the degree of opening depending upon the pressure in the passage 114'.

In order to prevent the motor 10 from operating faster, when the load is in the direction of the motor movement, the rate of exhaust from the cylinder is controlled.

The control of the rate of exhaust is regulated by adjusting the needle valve 122 or 122' so as to obtain the desired rate of flow for the pressure exerted by the working fluid in the connecting line 114 or 114'.

The pressure in the passage 120 is exerted against the lower side of the piston 102 and reacts against the pressure in the connecting line 114 which is exerted against the actuator piston 110. The back pressure on the upper side of the piston 102 is dependent upon the pressure drop through the passage 120a and past the needle valve 122. This pressure drop is proportional to the flow of exhaust working fluid. An increase in the downstream pressure of the passage 120a reduces the pressure differential across the piston 102 and permits the valve element 104 to open wider for a given pressure on the actuator piston 110. By regulating the needle valve 122, the rate of flow of exhaust fluid from the cylinder 12 through the passage 20 can be adjusted to the desired value for the pressure in the fluid line 70 which supplies working fluid to the cylinder 12 through the passage 16.

Similar apparatus for controlling the exhaust through the passage 18 has its corresponding parts indicated by the same reference characters as the exhaust control for the passage 20 but with a prime appended.

The invention has been described in connection with the diagrammatic illustration of FIG. 1 where the correlation of parts has been changed from the actual construction in order to illustrate more clearly the operation of the invention. The other figures of the drawing show the actual construction of the invention and the parts corresponding to those illustrated diagrammatically in FIG. 1 are indicated by the same reference characters as in FIG. 1.

FIGS. 3-5 show a commercial embodiment of the invention illustrated diagrammatically in FIG. 1. The connecting passages cannot be shown in FIGS. 3-5 as clearly as in FIG. 1 because of the different planes and different directions of the connecting passages, but FIGS. 3-5 show the principal subassemblies of the system and show their relationship with one another in a common housing 42 formed by an elaborate relation of drillings, bores and counterbores in a metal block. The construction is designed for compactness, minimum seals, and production by automatic machinery.

The chambers in which solenoids 74 and 74' are located are closed at their upper ends by plugs 150 and 150' screwed into the block that forms the housing 42. The guides 50 and 50' are in smaller plugs 152 and 152', respectively, screwed into the lower ends of the bores that provide chambers for the valves 52 and 52'. The check valves 72 and 72' have guides 154 and 154', respectively, that screw into opposite sides of the housing as shown in FIG. 2.

Figure 2:
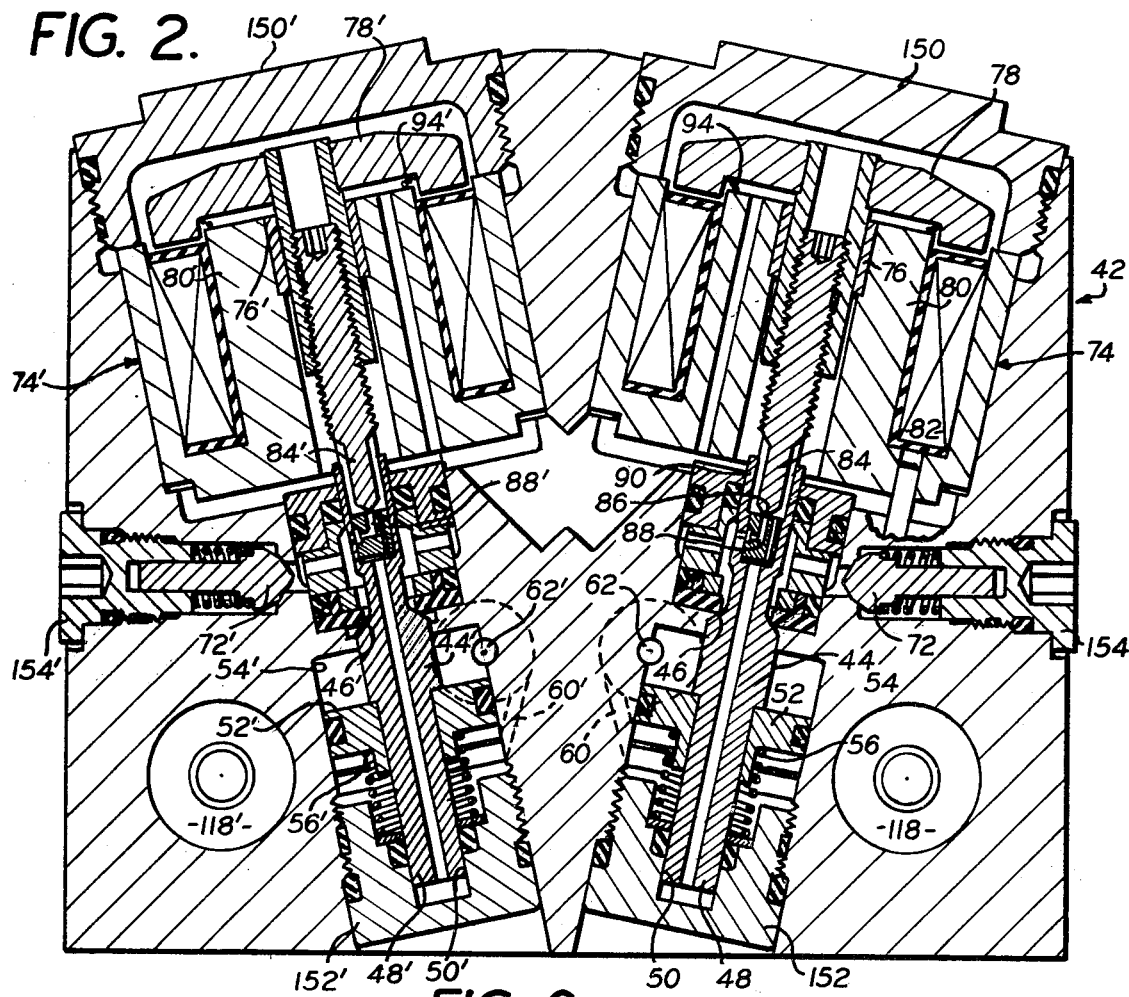
FIG. 2 is a sectional view through the flow regulator system of this invention, the section being taken on the line 2—2 of FIG. 3.
Figure 6:
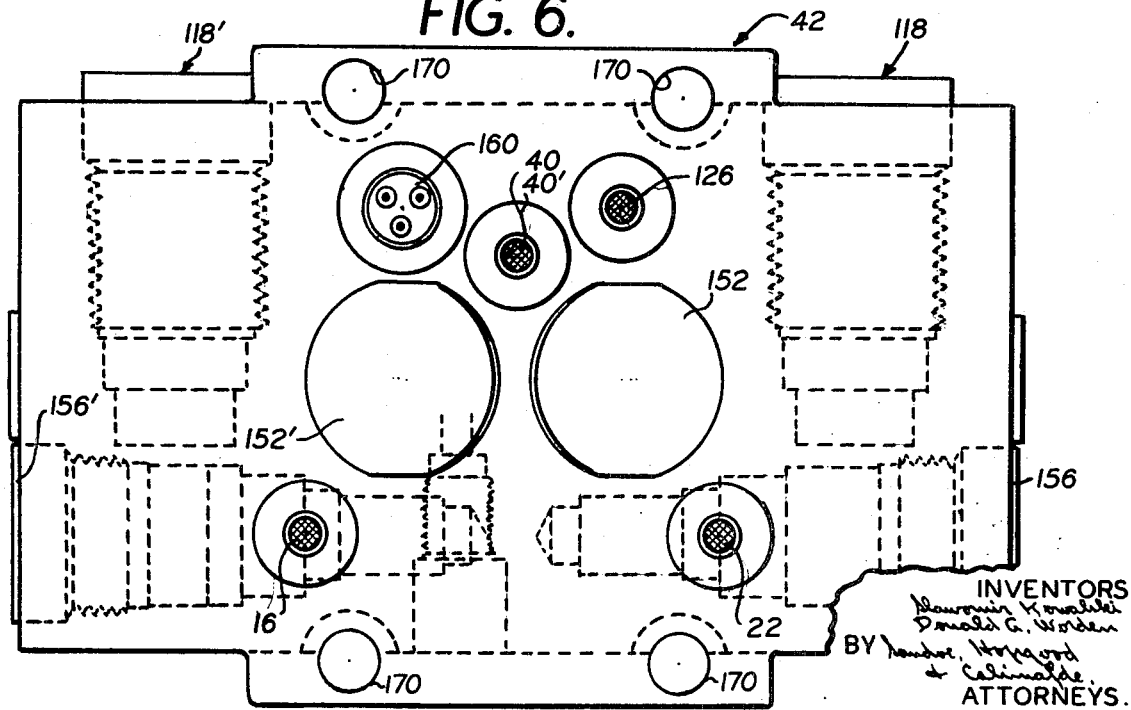
FIG. 6 is a bottom plan view of the apparatus shown in the other figures.

The exhaust valves 108 and 108' have guides 156 and 156', respectively, that screw into opposite ends of the housing as shown in FIGS. 4 and 6; and the relief valves 118 and 118' screw into the front of the housing as shown in FIGS. 2 and 3.

FIG. 3 shows the relief valve 118', which is shown diagrammatically in FIG. 1. A valve element 155' fits into a retainer 156' with passages 157' leading from the interior of the retainer 156' to the passage 16. The valve element 155' contacts with a seat element 158' which slides axially in the retainer 156'. A spring 159' urges the seat element 158' against a shoulder on the retainer 156' and into contact with the valve element 155'.

When the pressure in the passage 16 rises above a predetermined value, this pressure moves the seat element 158', against the pressure of the spring 159' and out of contact with the valve element 155' so that working fluid can escape through the passages 157', through the open interior of the seat element 158' and into the space containing the spring 159'. From this space the fluid escapes through the passage 140' as shown diagrammatically in FIG. 1.

There is a socket 160 (FIG. 6) for electrical connections but the electrical connections are not shown in FIGS. 2-6. Representative electrical controls are shown in FIG. 1 where the winding 82 is energized from a power line 162 through a circuit containing a potentiometer 164 for regulating the current and an ammeter or other readout device 166 graduated to indicate current, fluid flow, motor speed or any other indication that it is a function of the potentiometer adjustment. Similar controls for the other solenoid 74' are indicated by the same reference character with a prime appended.

FIG. 6 shows bolt holes 170 through the base of the housing 42 for connecting the housing to a support. All of the passages in the housing 42 communicate with openings through the bottom of the housing. The openings of the passages 16 and 22 are indicated by those reference characters in FIG. 6. The passages 40 and 40' communicate with each other within the housing and then open through the opening in the bottom indicated by the reference characters 40 and 40', this passage through the bottom of the housing being, in effect, a continuation of both of the passages 40 and 40'.

The preferred embodiment of the invention has been illustrated and described but changes and modifications can be made and some features can be used in different combinations without deviating from the invention as defined in the claims.

What is claimed is:

1. A flow control including in combination a plurality of flow-responsive valve means, said valve means comprising inlet control valve means and exhaust control valve means, each of said flow-responsive valve means comprising a valve element, a restricted passage through which fluid flows when the valve element is in open position, and comprising also a part subject on opposite sides to the fluid pressure upstream and downstream, respectively, of the restricted passage, said part being connected with the valve element and urging the valve element toward closed position with a force proportional to the excess of upstream pressure over downstream pressure, a motor that has a housing and an element movable with respect to the housing through a stroke, passages that connect with the housing on opposite sides of the movable element, said valve elements of different valve means controlling flow of working fluid to and from said passages for power and exhaust strokes, respectively, actuating means for the valve means, said actuating means including a signal-operated actuator that applies force to inlet control valve means for admitting working fluid to one end of the motor housing, another actuator that applies force to exhaust control valve means for the opposite end of the motor housing, said actuator that applies force to the exhaust control valve means being responsive to pressure of working fluid that flows in response to the same signal as operates the actuator for the inlet control valve means.

2. The flow control described in claim 1 characterized by the actuator for the exhaust control valve means having an operating element subject to the pressure of the working fluid flowing to the motor housing, and a connecting passage leading from the actuator for the exhaust control valve means to the passage which leads from the inlet control valve means to the motor housing.

3. The flow control described in claim 2 characterized by there being separate inlet and exhaust passages communicating with one end of the motor housing, and other inlet and exhaust passages communicating with the other end of the motor housing, the inlet control valve means of claim 5 controlling flow of working fluid at a different end of the motor housing from that from which working fluid is controlled by the exhaust control valve means, and other inlet control and exhaust control means and actuators in a similar relation to one another as those of claim 5 for controlling the flow of working fluid to and from the other inlet and exhaust passages, respectively.

4. The flow control described in claim 3 characterized by check valves in the inlet passages to prevent flow of working fluid from the motor housing back from the inlet passages, the exhaust control valve means being oriented to act as check valves to prevent exhaust of working fluid from the motor housing through the exhaust passages, the exhaust control valve means being movable into open position by their actuators.

5. The flow control described in claim 4 characterized by a pressure relief valve in position to relieve excessive pressure in the passage between each exhaust control valve means and the motor housing.

6. The flow control described in claim 3 characterized by the actuators for the inlet control valve means that control the flow of working fluid to the motor including electromagnetic means operable to move the valve elements toward open position and opposing the differential pressure across the part which is connected with the valve element, and means for regulating the cross-section of the restricted passage of each valve means to change the rate of flow obtained for any given force exerted by the electromagnetic means of the actuator of that valve means.

7. The flow control described in claim 6 characterized by the actuators for the exhaust control valve means that control the flow of working fluid from the motor being a cylinder-and-piston device with working fluid supplied thereto from the working fluid passage on the downstream side of the valve means operated by the electromagnetic means.

8. A flow control including in combination a plurality of flow-responsive valve means, each of said flow-responsive valve means comprising a valve element, a restricted passage through which fluid flows when the valve element is in open position, and comprising also a part subject on opposite sides to the fluid pressure upstream and downstream, respectively, of the restricted passage, said part being connected with the valve element and urging the valve element toward closed position with a force proportional to the excess of upstream pressure over downstream pressure, a motor that has a housing and an element movable with respect to the housing through a stroke, passages that connect with the housing on opposite sides of the movable element, said valve elements of different valve means controlling flow of working fluid to and from said passages for power and exhaust strokes, respectively, actuating means for the valve means whereby the rate of flow of working fluid to and from the motor is proportional to the force applied to the valve means by said actuating means both when working fluid is supplied to the motor to move a load and when the rate of exhaust of fluid from the motor holds the motor back when the load tends to move in the same direction as the motor, and characterized by the actuating means including a first actuator controlled by the operator of the system to supply force that operates the valve means to supply working fluid to one end of the motor housing, the actuating means also including a second actuator that operates a different one of the valve means to exhaust working fluid from said motor housing on the opposite side of the movable element of the motor from the side to which working fluid is being supplied, the second actuator communicating between the valve means and the motor housing, with the passage through which working fluid is being supplied to the motor housing, and the second actuator being operated by the pressure of working fluid in said passage with which the second actuator communicates.

* * * * *